US012689900B2

(12) United States Patent
Barton et al.

(10) Patent No.: US 12,689,900 B2
(45) Date of Patent: Jul. 21, 2026

(54) USER EQUIPMENT VULNERABILITY MANAGEMENT BASED TRAFFIC ROUTING WITH MULTI ACCESS EDGE COMPUTE

(71) Applicant: Cisco Technology, Inc., San Jose, CA (US)

(72) Inventors: Robert Edgar Barton, Richmond (CA); Flemming Stig Andreasen, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 333 days.

(21) Appl. No.: 18/320,352

(22) Filed: May 19, 2023

(65) Prior Publication Data

US 2024/0388914 A1      Nov. 21, 2024

(51) Int. Cl.
    *H04W 12/03*     (2021.01)
    *H04W 12/033*     (2021.01)
    *H04W 12/12*     (2021.01)
    *H04W 28/02*     (2009.01)

(52) U.S. Cl.
    CPC ......... *H04W 12/12* (2013.01); *H04W 12/033* (2021.01); *H04W 28/0215* (2013.01)

(58) Field of Classification Search
    CPC .............................. H04W 12/12; H04W 12/03
    See application file for complete search history.

(56) References Cited

U.S. PATENT DOCUMENTS 10,268,474 B2    4/2019   Stammers et al.
10,958,556 B2 *   3/2021   Rajalingam ......... H04L 41/0631

11,765,087 B1 *   9/2023   Balmakhtar ........ H04L 45/7453
                                    370/392
2007/0113080 A1   5/2007   Shankar et al.
2019/0238584 A1   8/2019   Somasundaram et al.
2020/0074085 A1 *   3/2020   Cheng ..................... H04W 4/70
2022/0368717 A1   11/2022   Mylavarapu et al.

FOREIGN PATENT DOCUMENTS

WO       2018075930 A1     4/2018

OTHER PUBLICATIONS

3GPP, Technical Specification, "5G; Procedures for the 5G System (5GS), (3GPP TS 23.502 version 16.7.0 Release 16)," ETSI TS 123 502 V16.7.0, 607 pages, Jan. 2021.
3GPP, Technical Specification, "5G; System architecture for the 5G System (5GS), (3GPP TS 23.501 version 16.6.0 Release 16)," ETSI TS 123 501 V16.6.0, 450 pages, Oct. 2020.
(Continued)

*Primary Examiner* — Michael T Vu
(74) *Attorney, Agent, or Firm* — Edell, Shapiro & Finnan, LLC

(57) ABSTRACT

A method to counter vulnerabilities associated with user equipment in operating via a 5G core architecture. The method includes monitoring a session between a user equipment and an endpoint, obtaining a vulnerability score for a vulnerability affecting the user equipment, selecting, based on the vulnerability score, a selected user plane function and a security service, accessible via the selected user plane function, to counter the vulnerability affecting the user equipment, and causing a packet flow of the session to be steered to the security service via the selected user plane function.

20 Claims, 5 Drawing Sheets

(56)            References Cited

OTHER PUBLICATIONS

Kholidy, H., et al. "A Triangular Fuzzy based Multicriteria Decision Making Approach for Assessing Security Risks in 5G Networks," Department of Networks and Computer Security, College of Engineering, State University of New York (SUNY) Polytechnic Institute, Utica, NY, arxiv.org, 22 pages, Dec. 2021.

3GPP, Technical Specification, "5G; 5G System Enhancements for Edge Computing; Stage 2, (3GPP TS 23.548 version 17.2.0 Release 17)," ETSI TS 123 548 V17.2.0, 58 pages, May 2022.

3GPP, Technical Specification, 5G; Security architecture and procedures for 5G System, (3GPP TS 33.501 version 17.5.0 Release 17), ETSI TS 133 501 V17.5.0, 296 pages, May 2022.

* cited by examiner

| | SECURITY SERVICE HOSTED BY SSE/SASE ON EAS OR UPF | UPF |
|---|---|---|
| VULNERABILITY 1 | IDS | UL CL/BP |
| VULNERABILITY 2 | DEEP PACKET INSPECTION | L-PSA |
| VULNERABILITY 3 | ANTIVIRUS | C-PSA |
| VULNERABILITY 4 | (D)DOS DETECTION | L-PSA |

FIG.3

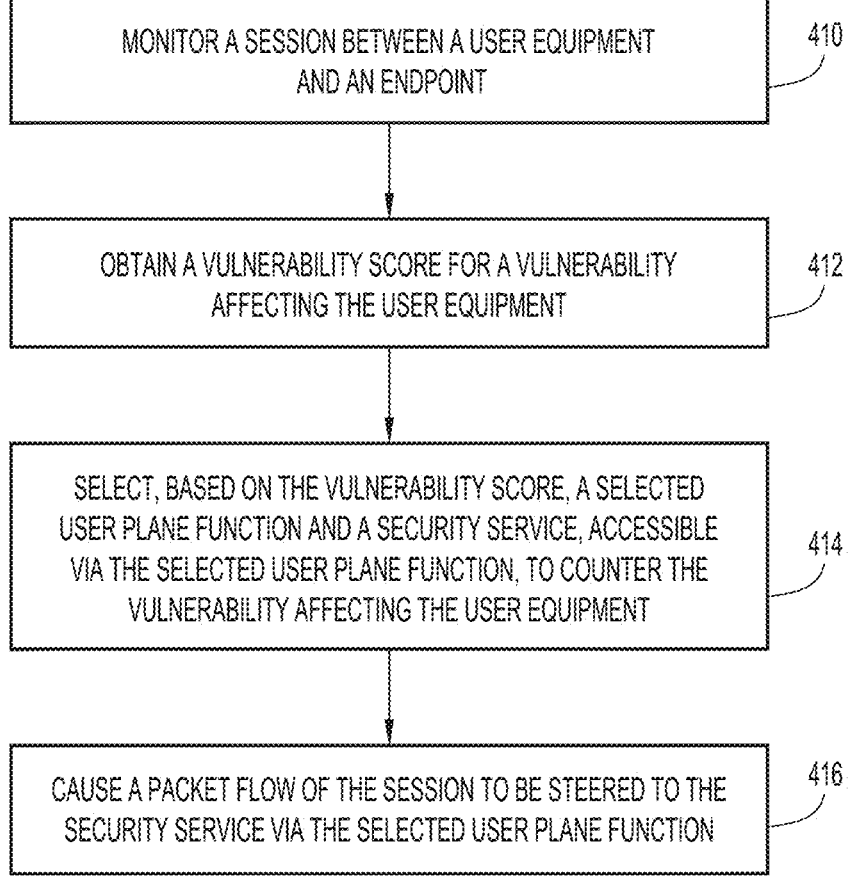

MONITOR A SESSION BETWEEN A USER EQUIPMENT AND AN ENDPOINT — 410

OBTAIN A VULNERABILITY SCORE FOR A VULNERABILITY AFFECTING THE USER EQUIPMENT — 412

SELECT, BASED ON THE VULNERABILITY SCORE, A SELECTED USER PLANE FUNCTION AND A SECURITY SERVICE, ACCESSIBLE VIA THE SELECTED USER PLANE FUNCTION, TO COUNTER THE VULNERABILITY AFFECTING THE USER EQUIPMENT — 414

CAUSE A PACKET FLOW OF THE SESSION TO BE STEERED TO THE SECURITY SERVICE VIA THE SELECTED USER PLANE FUNCTION — 416

FIG.4

USER EQUIPMENT VULNERABILITY MANAGEMENT BASED TRAFFIC ROUTING WITH MULTI ACCESS EDGE COMPUTE

TECHNICAL FIELD

The present disclosure relates to, e.g., fifth generation (5G) core network operations, and more particularly to vulnerability management of user equipment (UE) interacting with the core network.

BACKGROUND 5G devices may be subject to any number of vulnerabilities. Given the proliferation of such vulnerabilities, there are now mechanisms that can assign a formal score to a given vulnerability. One example of such a scoring mechanism is the Common Vulnerability Scoring System (CVSS), which provides one (static) quality measure of the severity of a given vulnerability. The CVSS vulnerability score gives security operations administrators a relative ranking of which devices are most vulnerable and might require remediation as soon as possible.

Another example of such a scoring mechanism is Kenna, a vulnerability assessment product available from Cisco Systems, Inc., San Jose, CA, that provides a contextual-based score based on the risk a vulnerability poses to an organization. In the case of Kenna, the vulnerability score is generated by an artificial intelligence (AI)/machine learning (ML) algorithm that uses inputs including information learned from endpoint scanning data and known threats from a variety of trusted sources.

Whatever the scoring system, different vulnerabilities may be deemed as having their own criticalities in terms of protecting against those vulnerabilities being exploited. Notably, however, it is often not possible to immediately (or sometimes ever) patch a device to counter a given vulnerability.

BRIEF DESCRIPTION OF THE DRAWINGS

FIG. 3 shows an example mapping among vulnerabilities, corresponding security services for countering such vulnerabilities, and selected UPFs that host, or provide access to, the security services, according to an example embodiment.

FIG. 4 shows a series of operations for operating an SMF that executes security service selection logic, according to an example embodiment.

DETAILED DESCRIPTION

Overview

A method to counter vulnerabilities associated with user equipment in operating via a 5G core architecture is presented. The method includes monitoring a session between a user equipment and an endpoint, obtaining a vulnerability score for a vulnerability affecting the user equipment, selecting, based on the vulnerability score, a selected user plane function and a security service, accessible via the selected user plane function, to counter the vulnerability affecting the user equipment, and causing a packet flow of the session to be steered to the security service via the selected user plane function.

In another embodiment, a device is provided. The device includes an interface configured to enable network communications, a memory, and one or more processors coupled to the interface and the memory, and configured to monitor a session between a user equipment and an endpoint, obtain a vulnerability score for a vulnerability affecting the user equipment, select, based on the vulnerability score, a selected user plane function and a security service, accessible via the selected user plane function, to counter the vulnerability affecting the user equipment, and cause a packet flow of the session to be steered to the security service via the selected user plane function.

Example Embodiments

Figure 1:
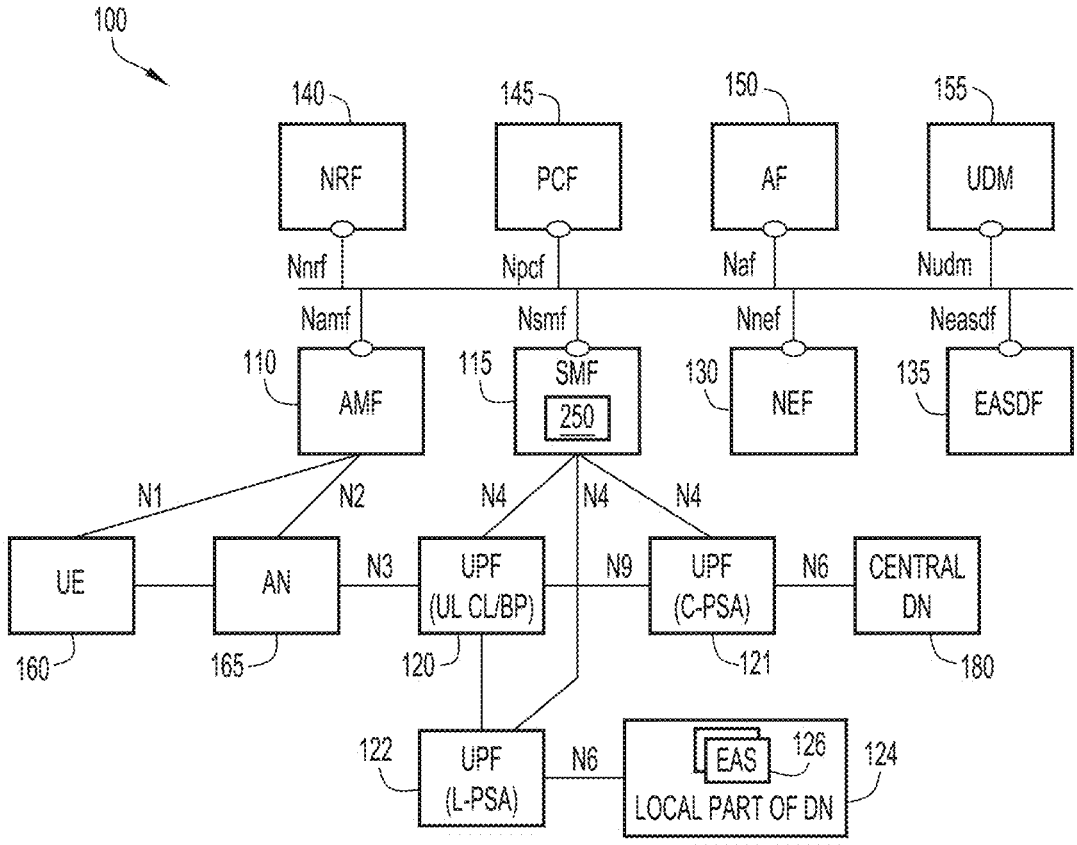
FIG. 1 shows an implementation of a 5G core architecture that comprises multiple network functions (NFs), including a Session Management Function (SMF) that may host security service selection logic, according to an example embodiment.

FIG. 1 shows an implementation of, e.g., a (5G) core architecture 100 that comprises multiple network functions (NFs) or functional nodes, including a Session Management Function (SMF) 115 that may host security service selection logic 250, according to an example embodiment. More specifically, FIG. 1 shows the 3GPP reference architecture (from 3GPP TS 23.548, V18.1.1, Section 4.2 (2023 April)) for non-roaming edge computing leveraging an uplink classifier and branching point (UL CL/BP).

The core architecture 100 includes an Access and Mobility Management Function (AMF) 110 that, e.g., supports termination of non-access stratum (NAS) signaling, NAS ciphering & integrity protection, registration management, connection management, mobility management, access authentication and authorization, and security context management.

Session Management Function (SMF) 115, as noted, supports session management (e.g., session establishment, modification, release), user equipment (UE) internet protocol (IP) address allocation & management, Dynamic Host Configuration Protocol (DHCP) functions, termination of NAS signaling related to session management, downlink (DL) data notification, and traffic steering configuration for User Plane Functions (UPFs) for proper traffic routing. And, as will be explained further below, also may host security service selection logic 250.

Multiple User Plane Functions (UPFs) are shown. A UL CL/BP UPF 120 supports, e.g., packet routing & forwarding, packet inspection, QoS handling, may act as an external protocol data unit (PDU) session point of interconnect to a Data Network (DN) 180, and may be an anchor point for intra-and inter-radio access technology (RAT) mobility. A Central PDU Session Anchor, or C-PSA UPF 121, and a Local PSA, or L-PSA UPF 122 may provide similar functionality, and may be "closer" logically, and/or physically, to a given data network or data flow. In this regard, L-PSA UPF 122 may be in communication with a local part of a data network (DN) 124, which may host at least one edge application server (EAS) 126.

A Network Exposure Function (NEF) 130 is responsible for managing the external open network data, and external applications that want to access the internal data of the 5G core typically pass through the NEF 130.

An Edge Application Server Discovery Function (EASDF) 135 helps a UE 160 discover the closest available edge application server, e.g., EAS 126, to its location. EASDF 135 may act as a Domain Name Server (DNS) resolver to the UE 160 and can complement the DNS queries with UE location-related information.

A Network Repository Function (NRF) 140 allows NFs to register and discover each other via a standards-based API.

A Policy Control Function (PCF) 145 supports, e.g., unified policy framework, and provides policy rules to control plane functions, and access subscription information for policy decisions in, e.g., a user data repository (UDR).

An Application Function (AF) 150 supports application influence on traffic routing, and interaction with policy framework for policy control.

A Unified Data Management (UDM) 155 function supports generation of Authentication and Key Agreement (AKA) credentials, user identification handling, access authorization, and subscription management.

The several NFs described above and depicted in FIG. 1 may communicate with one another via, among other connections, depicted connections Namf, Nsmf, Snef, Neasdf, Nnrf, Npcf, Naf, Nudm, and links N1-N15, with N4 links enabling communication between SMF 115 and each of UL CL/BP UPF 120, C-PSA UPF 121, or L-PSA UPF 122.

Still other nodes, functionality, and interconnectivity may also be provided.

Also shown in FIG. 1 is UE 160 that may communicate over (Radio) Access Network (AN) 165 and via core architecture 100 to reach Central DN 180 and/or local part of DN 124.

As noted, UE 160 may be impacted by a vulnerability, but it may not be possible or practical to directly patch the UE 160 to counter that vulnerability. In such scenarios, the vulnerable device (e.g., UE 160) may be protected by use of additional security services, e.g., an Intrusion Prevention System (IPS).

One common method to apply such a security service is to ensure that all traffic to/from UE 160 is routed through that IPS. However, in practice, this approach has some shortcomings:

1) A given vulnerability may only be relevant to certain applications and packet flows and hence sending all traffic through the security service can be both wasteful (e.g., IPS resources) and service impacting (e.g., QoS).

2) The 5G system supports edge computing (e.g., via EAS 126) where a given device may leverage different UPFs for different applications and packet flows. However, in practice, it is unlikely that any given UPF supports the particular set of security services to protect against a given vulnerability.

The embodiments described herein address the above scenarios in a resource-efficient and flexible manner while providing the particular security (e.g., IPS) and desired quality of service (e.g., ultra-reliable low latency communications (URLLC)).

As shown in FIG. 1, and as noted, there are multiple UPF instances, namely UL CL/BP UPF 120, C-PSA UPF 121, and L-PSA UPF 122. C-PSA UPF 121 and L-PSA UPF 122 may each support a certain set of applications/flows. In a typical deployment scenario, the C-PSA UPF 121 might be associated with a variety of security services (e.g., IDS/IPS), whereas L-PSA UPF 122 might not.

In many cases, AF 150 may influence the selection of a given UPF instance by sending a request to PCF 145, which translates the request into policies for the PDU session(s). However, heretofore, those policies have not considered any particular vulnerabilities for a given UE 160, security service requirements for the UE 160, or application-specific vulnerabilities and security requirements for a given PDU session (for a given UE 160).

In this regard, the embodiments described herein extend UPF selection procedures to take into account, i.e., consider, a given UE's vulnerabilities based, e.g., on a CVSS score that identifies special security handling of the device. The methodology may operate as follows.

Figure 2:
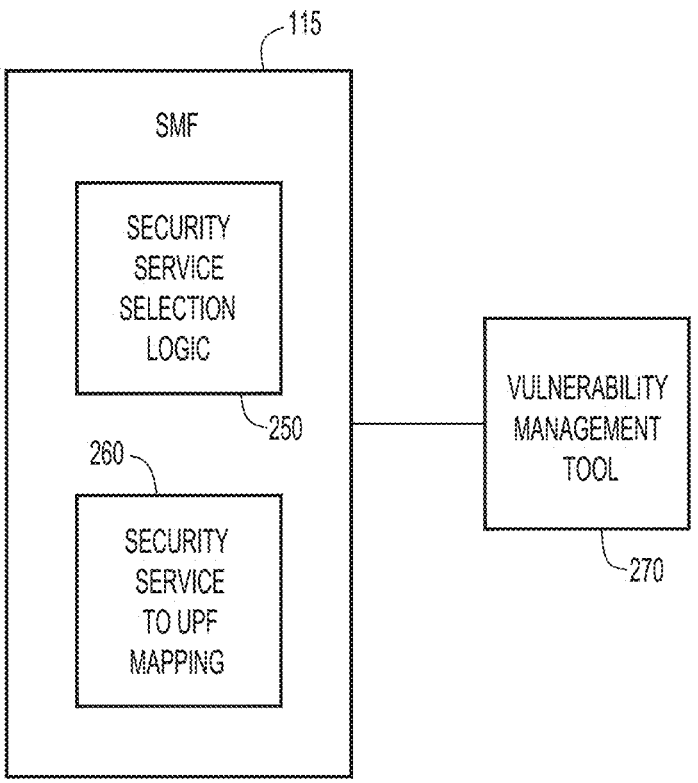
FIG. 2 shows an SMF configured with security service selection logic, along with a security service to UPF mapping module, according to an example embodiment.

SMF 115 obtains information about the vulnerabilities and associated vulnerability scores for UE 160 from a vulnerability management tool 270, such as a CVSS database or Kenna, and determines whether to apply a security service to UE 160 based on its (elevated) CVSS score. In this regard, FIG. 2 shows SMF 115 configured with security service selection logic 250, along with a security service to UPF mapping module 260, according to an example embodiment. As shown, SMF 115 is in communication with vulnerability management tool 270 such as a CVSS score database and/or Kenna.

SMF 115, via security service to UPF mapping module 260, is aware of the security services provided by, or that are accessible via, each of the UPFs. For example, FIG. 3 shows an example mapping among vulnerabilities, and selected UPFs that host, or provide access to, the security services, according to an example embodiment. As shown, Vulnerability 1 may be countered with an intrusion detection system (IDS) that is hosted by, or accessible via, UL CL/BP UPF 120. Vulnerability 2 may be countered with deep packet inspection, which may be hosted by, or accessible via, L-PSA UPF 122. Vulnerability 3 may be countered by an antivirus application, which may be hosted by, or accessible via, C-PSA UPF 121. And, Vulnerability 4 may be countered by a (Distributed) Denial of Service (D)(DOS) Detection application, which may also be hosted by, or accessible via, L-PSA UPF 122. Those skilled in the art will appreciate that FIG. 3 merely shows an example of the type of countermeasures that may be applied to help counter a vulnerability deemed to be associated with a given UE, e.g., UE 160.

Referring back to FIG. 1, core architecture 100 includes a set of local Security Service Edge (SSE) or Secure Access Service Edge (SASE) points of presence (PoP) hosted by one or more EAS 126 or a given UPF, and associated with each of these are: the security services capabilities provided by the SSE/SASE PoP, and the proximity to each UPF and associated QoS parameters (bandwidth, latency, etc.).

Knowing the foregoing information, SMF 115, namely security service selection logic 250, selects a combination of UPF and SSE/SASE PoP that satisfy the PDU session policies and also provides protection against the vulnerabilities deemed critical for the application in question. In essence, security service selection logic 250 maps the vulnerable UE PDU session to a specialized security service that addresses the security vulnerability of UE 160.

The PDU session is established on the selected UPF, and as part of the session establishment, traffic steering policies may be provided to ensure the traffic will traverse the SSE/SASE PoP, hosted on a given EAS 126 or a given UPF, and thereby counter the vulnerability to which UE 160 is susceptible.

Traffic steering may be achieved via tunneling or by the SSE/SASE PoP offering the UPF function.

If UE 160 is patched at some point and the CVSS score is revised downward, traffic steering toward a security protection system may no longer be desired. That is, this type of traffic steering may only be executed for UEs that have an elevated security threat posture. In this way, a dynamic application of countermeasures may be implemented.

As those skilled in the art will appreciate, the embodiments described herein enable vulnerable endpoints to be protected by security infrastructure (e.g., an IPS) without requiring all traffic to be routed through the security infrastructure. A key point is that the protection provided is based on a vulnerability score associated with a particular UE and/or a particular application on the UE. The embodiments operate particularly well in contexts of both central and distributed (edge compute) deployment models, especially with multiple UPF instances.

FIG. 4 shows a series of operations for operating, e.g., an SMF that executes security service selection logic, according to an example embodiment. At 410, an operation includes monitoring a session between a user equipment and an endpoint. At 412, an operation includes obtaining a vulnerability score for a vulnerability affecting the user equipment. At 414, an operation includes selecting, based on the vulnerability score, a selected user plane function and a security service, accessible via the selected user plane function, to counter the vulnerability affecting the user equipment. And, at 416, an operation includes causing a packet flow of the session to be steered to the security service via the selected user plane function.

Figure 5:
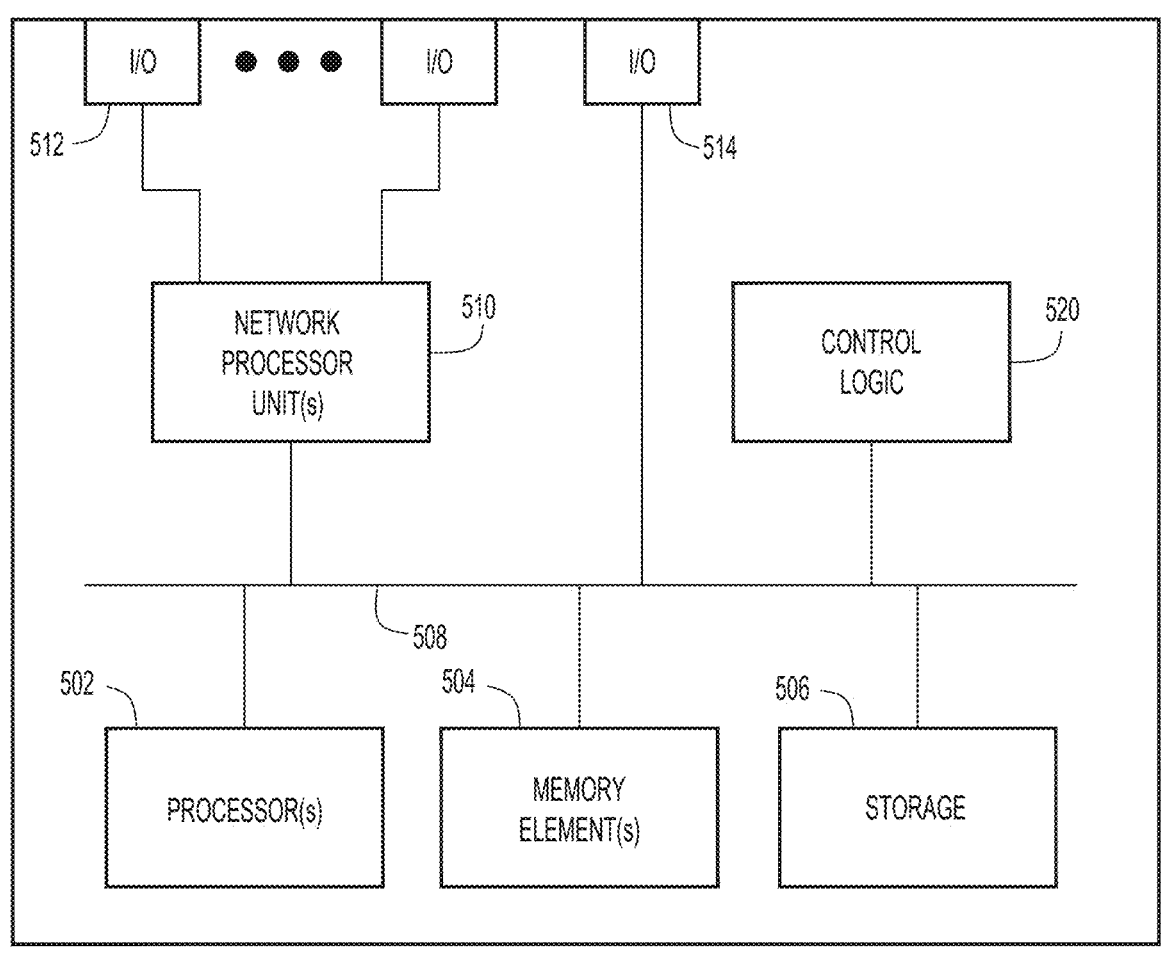
FIG. 5 is a block diagram of a computing device that may be configured to execute SMF functionality including security service selection logic and perform the techniques described herein, according to an example embodiment.

FIG. 5 is a block diagram of a computing device that may be configured to execute functionality of SMF 115, including security service selection logic 250, and perform the techniques described herein, according to an example embodiment. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, security service selection logic 250). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data, and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read-only memory (ROM), erasable programmable read-only memory (EPROM), application-specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software-defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc., which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores, or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In sum, a method may include monitoring a session between a user equipment and an endpoint, obtaining a vulnerability score for a vulnerability affecting the user equipment, selecting, based on the vulnerability score, a selected user plane function and a security service, accessible via the selected user plane function, to counter the vulnerability affecting the user equipment, and causing a packet flow of the session to be steered to the security service via the selected user plane function.

In the method, the session may be a session being processed by a fifth generation core network.

The method may be performed, at least in part, by a session management function of the fifth generation core network.

The method may further include obtaining the vulnerability score from a Common Vulnerability Scoring System (CVSS).

In the method, the selected user plane function may operate as an uplink classifier and branching point.

In the method, the selected user plane function may operate as a local PDU session anchor.

In the method, the selected user plane function may be selected based on at least one of latency to reach the security service and bandwidth to reach the security service.

In the method, the security service may be hosted by the selected user plane function.

In the method, the security service may be hosted by an edge application server.

The method may further include tunneling the packet flow of the session to the security service.

In another embodiment, a device may be provided and may include an interface configured to enable network communications, a memory, and one or more processors coupled to the interface and the memory, and configured to: monitor a session between a user equipment and an endpoint, obtain a vulnerability score for a vulnerability affecting the user equipment, select, based on the vulnerability score, a selected user plane function and a security service, accessible via the selected user plane function, to counter the vulnerability affecting the user equipment, and cause a packet flow of the session to be steered to the security service via the selected user plane function.

In the device, the session may be a session being processed by a fifth generation core network.

The device may be a session management function of the fifth generation core network.

In the device, the one or more processors may be further configured to obtain the vulnerability score from a Common Vulnerability Scoring System (CVSS).

In the device, the selected user plane function may operate as an uplink classifier and branching point.

In the device, the selected user plane function may operate as a local PDU session anchor.

In the device, the selected user plane function may be selected based on at least one of latency to reach the security service and bandwidth to reach the security service.

In yet another embodiment, one or more non-transitory computer readable storage media encoded with instructions are provided and that, when executed by a processor, cause the processor to: monitor a session between a user equipment and an endpoint, obtain a vulnerability score for a vulnerability affecting the user equipment, select, based on the vulnerability score, a selected user plane function and a security service, accessible via the selected user plane function, to counter the vulnerability affecting the user equipment, and cause a packet flow of the session to be steered to the security service via the selected user plane function.

The processor may be part of a session management function (SMF) of a 5G core network.

The instructions, when executed by the processor, may be configured to obtain the vulnerability score from a Common Vulnerability Scoring System (CVSS).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

monitoring a session, through a mobile core network that includes an application function, between a user equipment and an endpoint;

obtaining a vulnerability score for a vulnerability affecting the user equipment;

selecting, based on a combination of the vulnerability score and a protocol data unit session policy set by the application function, a selected user plane function and a security service, accessible via the selected user plane function, to counter the vulnerability affecting the user equipment, wherein the selected user plane function is part of the mobile core network; and causing a packet flow of the session to be steered to the security service via the selected user plane function.

2. The method of claim 1, wherein the session is a session being processed by the mobile core network.

3. The method of claim 2, wherein the method is performed, at least in part, by a session management function of the mobile core network.

4. The method of claim 1, further comprising obtaining the vulnerability score from a Common Vulnerability Scoring System.

5. The method of claim 1, wherein the selected user plane function operates as an uplink classifier and branching point.

6. The method of claim 1, wherein the selected user plane function operates as a local protocol data unit session anchor.

7. The method of claim 1, wherein the selected user plane function is selected based on at least one of latency to reach the security service and bandwidth to reach the security service.

8. The method of claim 1, wherein the security service is hosted by the selected user plane function.

9. The method of claim 1, wherein the security service is hosted by an edge application server.

10. The method of claim 1, further comprising tunneling the packet flow of the session to the security service.

11. A device comprising:

an interface configured to enable network communications;

a memory; and one or more processors coupled to the interface and the memory, and configured to:

monitor a session, through a mobile core network that includes an application function, between a user equipment and an endpoint;

obtain a vulnerability score for a vulnerability affecting the user equipment;

select, based on a combination of the vulnerability score and a protocol data unit session policy set by the application function, a selected user plane function and a security service, accessible via the selected user plane function, to counter the vulnerability affecting the user equipment, wherein the selected user plane function is part of the mobile core network; and cause a packet flow of the session to be steered to the security service via the selected user plane function.

12. The device of claim 11, wherein the session is a session being processed by the mobile core network.

13. The device of claim 12, wherein the device is a session management function of the mobile core network.

14. The device of claim 11, wherein the one or more processors are further configured to obtain the vulnerability score from a Common Vulnerability Scoring System.

15. The device of claim 11, wherein the selected user plane function operates as an uplink classifier and branching point.

16. The device of claim 11, wherein the selected user plane function operates as a local protocol data unit (PDU) session anchor.

17. The device of claim 11, wherein the selected user plane function is selected based on at least one of latency to reach the security service and bandwidth to reach the security service.

18. One or more non-transitory computer readable storage media encoded with instructions that, when executed by a processor, cause the processor to:

monitor a session, through a mobile core network that includes an application function, between a user equipment and an endpoint;

obtain a vulnerability score for a vulnerability affecting the user equipment;

select, based on a combination of the vulnerability score and a protocol data unit session policy set by the application function, a selected user plane function and a security service, accessible via the selected user plane function, to counter the vulnerability affecting the user equipment, wherein the selected user plane function is part of the mobile core network; and cause a packet flow of the session to be steered to the security service via the selected user plane function.

19. The one or more non-transitory computer readable storage media of claim 18, wherein the processor is part of a session management function of the mobile core network.

20. The one or more non-transitory computer readable storage media of claim 18, wherein the instructions, when executed by the processor, are configured to obtain the vulnerability score from a Common Vulnerability Scoring System.

* * * * *